United States Patent [19]
Pawlowski

[11] Patent Number: 5,550,533
[45] Date of Patent: Aug. 27, 1996

[54] HIGH BANDWIDTH SELF-TIMED DATA CLOCKING SCHEME FOR MEMORY BUS IMPLEMENTATION

[75] Inventor: Stephen S. Pawlowski, Beaverton, Oreg.

[73] Assignee: Intel Corporation, Santa Clara, Calif.

[21] Appl. No.: 339,635

[22] Filed: Nov. 14, 1994

Related U.S. Application Data

[63] Continuation of Ser. No. 999,283, Dec. 30, 1992, abandoned.

[51] Int. Cl.$^6$ .............................. H04L 1/16; H04Q 1/30; G06F 1/12
[52] U.S. Cl. .......... 340/825.2; 371/37.1; 371/53; 178/4.1 C; 178/69 H; 178/69 L
[58] Field of Search ............. 340/825.54, 825.2, 340/825.69; 307/409, 480; 371/37.1, 53; 178/4.1 C, 69 H, 69 L; 327/144, 295

[56] References Cited

U.S. PATENT DOCUMENTS

| | | | |
|---|---|---|---|
| 4,677,433 | 6/1987 | Catlin et al. | 340/825.2 |
| 5,263,172 | 11/1993 | Olnowich | 340/825.2 |

*Primary Examiner*—Donald J. Yusko
*Assistant Examiner*—David Jung
*Attorney, Agent, or Firm*—Blakely, Sokoloff, Taylor & Zafman

[57] ABSTRACT

A clocking scheme for transferring data between electronic devices. The clocking scheme includes sending a data request signal from a first device to a second device during a first system clocking period. The second device then sends the requested data and a corresponding data validation signal to the first device. The data validation signal latches the data into the second device. The data is latched by the validation signal in a time period that is typically shorter than the clocking period of the system clock.

4 Claims, 1 Drawing Sheet

HIGH BANDWIDTH SELF-TIMED DATA CLOCKING SCHEME FOR MEMORY BUS IMPLEMENTATION

This is a continuation of application Ser. No. 07/999,283 filed Dec. 30, 1992 now abandoned.

BACKGROUND OF THE INVENTION

1. Field of the Invention

The present invention relates to a clocking scheme for the transfer of data between two or more electronic devices.

2. Description of Related Art

Data is typically transferred between two electronic components in accordance with a predefined clocking scheme. For example, transferring data from a memory device to a processor typically includes, among other things, the steps of generating a data request signal that is sent from the processor to memory and then sending the requested data from memory to the processor. Both the data request signal and the data are typically latched into the respective devices with clock pulses from a system clock. Consequently, it takes at least two clock cycles of the system clock to transfer data from one device to another device.

It is desirable to provide a bus that has a high data rate, so that the bus does not slow down the speed of the system. One way to increase the data rate is to enlarge the size of the bus. Providing a larger bus, increases the number of pins of the devices and the overall size of the system. High data transfer rates can also be achieved by increasing the speed of the clock. Increasing the clock frequency may create timing problems, particularly if the clock is routed to multiple components. It would therefore be desirable to have a data transfer clocking scheme that would increase the data rate of a system without increasing the width of the bus or the speed of the clock.

SUMMARY OF THE INVENTION

The present invention is a clocking scheme for transferring data between electronic devices. The clocking scheme includes sending a data request signal from a first device to a second device during a first clocking period. The second device then sends the requested data and a data validation signal to the first device.

The data validation signal latches the data into the second device. The data is latched by the validation signal in a time period that is typically shorter than the clocking period of the system clock. The present invention therefore increases the data transfer rate of a system without increasing the size of the data bus or the speed of the system clock.

Therefore it is an object of the present invention to provide a clocking scheme for transferring data that increases the data transfer rate between two devices.

It is also an object of the present invention to increase the data transfer rate between two devices without increasing the data bus width or clock speed of the system.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
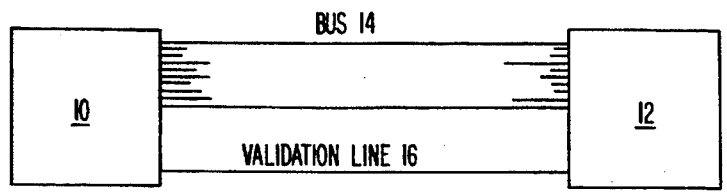
FIG. 1 is a schematic of a pair of devices coupled by a data bus and a data validation line.

Referring to the drawings more particularly by reference numbers, FIG. 1 shows a schematic of a simple computer architecture which can utilize the present invention. The system includes a first device 10 and a second device 12 that are coupled together by a bus 14. The bus 14 typically includes a plurality of conductive traces that carry digital signals. The devices can be any type of electrical components. For example, the first device 10 may be a microprocessor and the second device 12 may a memory device. The system also has a separate data validation line 16 that carries a data validation strobe transmitted between the first 10 and second 12 devices.

Figure 2:
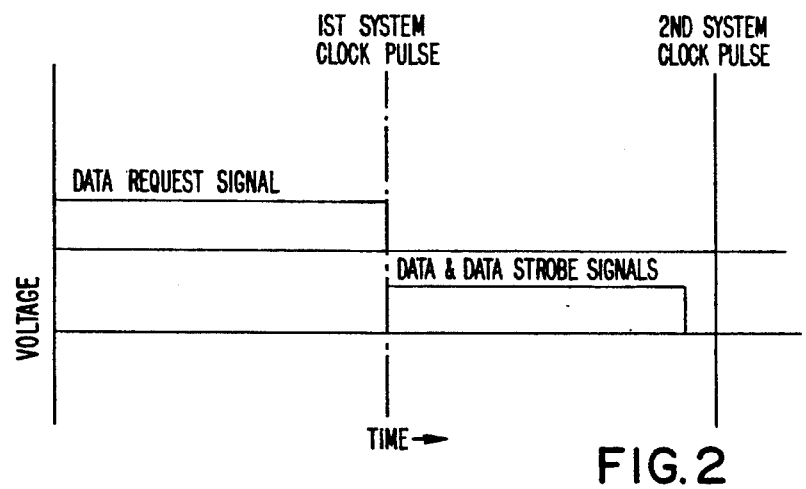
FIG. 2 is a schematic of a timing diagram for data transmitted in accordance with the present invention.

As shown in FIG. 2, the digital signals are typically transmitted between the devices within clocking intervals. For example, when the first device 10 request data from the second device 12, the first device 10 sends a data request signal to the second device 12. The data request signal is typically a plurality of address signals that define the address of the accessed memory location, along with a read/write signal which indicates either a read or write function. The address and read/write signals are typically transmitted over dedicated traces in the bus 14. The data request signal is typically latched into the second device by a clock pulse which may be generated by a system clock.

After the data request signal is received by the second device 12, the second device 12 sends data to the first device 10 on the bus 14. The second device 12 also sends a data validation strobe signal on the validation line 16. The data strobe is received by the first device 10 and used to latch the data into the device 10. The data and data strobe are both sent and received in a time that can be less than the clock time interval of the system. This is to be distinguished from the prior art where the first device would typically have to wait until the system clock pulse was received by the device to latch in the data. The present invention thus increases the data rate of the system. The present invention also provides a data latching scheme that is independent of the clock of the system. Although the transfer of data from the second device to the first device is described, it is to be understood that the present invention can be used to transfer data from the first device to the second device.

Figure 3:
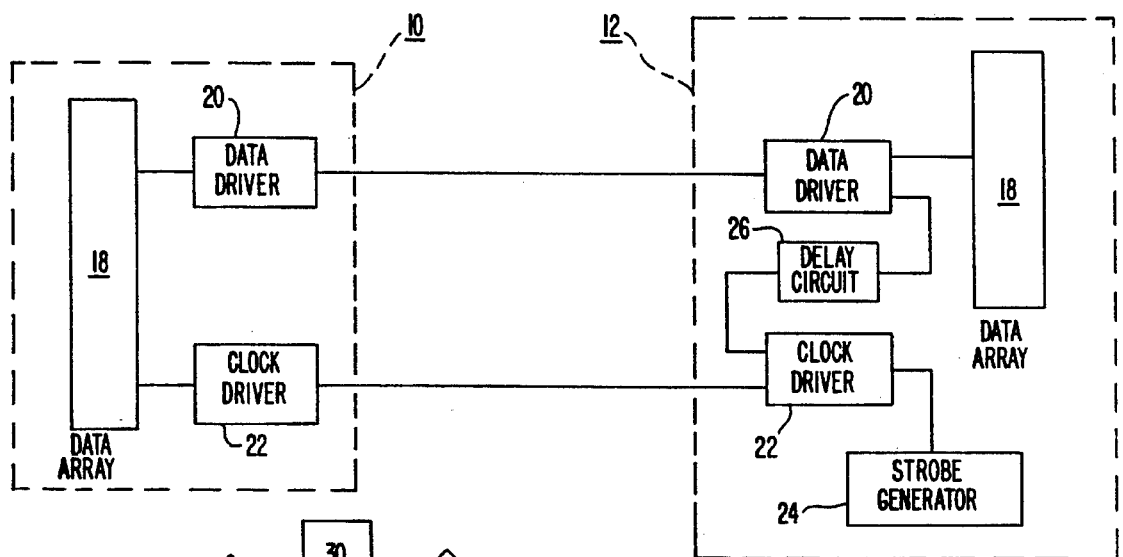
FIG. 3 is a more detailed schematic of the system shown in FIG. 1.

FIG. 3 shows a preferred embodiment of the system shown in FIG. 1. Each device may have data arrays 18 along with data drivers 20 that send and receive data from the other device. The devices also have clock drivers 22 that can receive inputs from the system clock. Additionally, the second device 12 has a data validation strobe generator 24 and possibly a delay circuit 26. By way of example, the system will be constructed so that the second device 12 sends data to the first driver 10, although it is to be understood that the first device 10 may have a data strobe generator 24 and a delay circuit 26 to send data from the first device 10 to the second device 12.

To transmit data, the first device 10 sends a data request signal(s) to the second device 12. The system clock provides a pulse which latches the request signal into the second device 12. The request signal is received by the strobe generator 24 which causes the data to be retrieved from the memory cells of the second device 12 and sent to the first device 10 by the data drivers 20 of the second device 12. When the data drivers 20 send the data to the first device 10, an enable signal is sent to the clock driver 22 through the delay circuit 26. The enable signal causes the clock driver 22 to send the validation signal to the first device 10. The data validation signal then latches in the transmitted data into the data array 18 of the first device 10. The delay circuit 26 can be designed to create a delay between the transmission of data and the sending of the validation signal. The delay circuit 26 can be a simple trace which decreases the speed of the strobe generator signal between the data driver 20 and the data strobe generator 24.

The delay circuit 26 can be designed in accordance with the following equation:

$$Tdel = Thold - Tpd(min) \pm \Delta TOF$$

where;

Tdel=the delay time between the strobe generator and the data driver.

Thold=the time needed by the receiver for the data signals to remain valid after the data validation signal is received.

Tpd(min)=the minimum time that the data drivers can send the data.

ΔTOF=the difference in time between the arrival of the data and the data strobe at the first device if both signals were sent by the second device at the same time. ΔTOF is subtracted if the data strobe normally lags the data and added if the data strobe normally leads the data.

ΔTOF is computed in accordance with the following equation:

$$\Delta TOF = \Delta LTOF + \Delta SKEW + \Delta OTOF$$

where;

ΔLTOF=the time differential due to the traces within the first device.

ΔSKEW=the time differential due to the delays of the signals going through the data and clock drivers.

ΔOTOF=the time differential due to the traces in the bus.

If the system without a delay circuit always creates a condition where the data lags the data strobe, then no delay is needed (eq. Tdel=0). Additional, if the term ΔTOF is less than or equal to Tpd(min)−Thold, then Tdel=0, and no delay circuit is needed.

The total time to send the validation signal (TVS) from the strobe generator 24 to the receiving device can be computed using the equation:

$$TVS = Tdel + Tpd(max) + Tsu \pm \Delta TOF$$

where;

Tpd(max)=the maximum time needed for the data drivers to send data.

Tsu=the time needed for the receiver to receive data before the data validation signal arrives.

The circuits should be designed so that the data strobe either lags or reaches the first device at the same time as the data transmitted by the second device.

Figure 4:
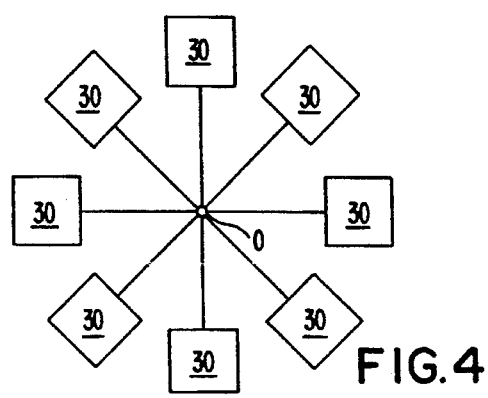
FIG. 4 is a schematic of a bus architecture that utilizes the method of the present invention.

FIG. 4 shows a preferred embodiment of a bus architecture that has a plurality of interconnected devices 30. The devices 30 are all equally spaced from a single point O, which may be a via in a printed circuit board. The equal space arrangement of the devices insures that a transmitted packet of data and data strobe will arrive at any of the devices at the same time. Such an arrangement simplifies the timing scheme of the system. The equally spaced devices also provides a system that has equal impedances between the devices. The equal impedances reduces the amount of signal ringing in the system. Although a system is shown where one set of data is sent from the second device to the first device, it is to be understood that the present invention can be used for systems that transfer data in multiple packets, wherein a validation signal is sent with each packet.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for transmitting data from a first device to a second device, comprising the steps of:

a) sending a data request from the first device to the second device;

b) sending a system clock signal from a system clock to said second device to latch said data request signal into said second device, said system clock having a first clock period;

c) sending data from the second device to the first device d) sending a data validation signal from said second device to said first device to latch said data into said first device, said data validation signal lagging said data and having a second clock period that is less than first clock period, said data validation signal being unique to said data sent by the second device.

2. A system, comprising:

first transceiver means for sending a data request;

second transceiver means for receiving said data request signal and sending data and a data validation signal to said first transmitter means, wherein said data validation signal lags and latches said data into said first transmitter means, said data validation signal having a first clock period, said data validation signal being unique to said data sent by said second transceiver means;

a system clock that generates and sends a clock signal to said second transceiver means to latch said data request into said second transceiver means, said clock signal has a second clock period that is greater than said first clock period.

3. The system as recited in claim 2, wherein said second transceiver means includes delay circuit means for transmitting said data validation signal such that said data validation signal lags said data.

4. A system, comprising:

a first device that sends a data request;

a second device that receives said data request and sends data and a data validation signal that lags and latches said data into said first device, said data validation signal having a first clock period, said data validation signal being unique to said data sent by said second device;

a system clock that generates and sends a clock signal to said second device to latch said data request into said second device, said clock signal has a second clock period that is greater than said first clock period.

\* \* \* \* \*